(12) United States Patent
Byun et al.

(10) Patent No.: US 8,773,847 B2
(45) Date of Patent: Jul. 8, 2014

(54) WATCH TYPE MOBILE TERMINAL

(75) Inventors: Huiseob Byun, Seoul (KR); Changbai Won, Gyeongg-Do (KR); Inseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/956,994

(22) Filed: Nov. 30, 2010

(65) Prior Publication Data

US 2011/0221688 A1 Sep. 15, 2011

(30) Foreign Application Priority Data

Mar. 15, 2010 (KR) ........................ 10-2010-0022981

(51) Int. Cl.
- *G06F 1/16* (2006.01)
- *H05K 5/00* (2006.01)
- *A44C 5/00* (2006.01)

(52) U.S. Cl.
USPC ..................................... 361/679.03; 368/281

(58) Field of Classification Search
CPC ............................... G04B 37/14; G06F 1/163
USPC ............ 361/679.03; 455/575.6; 368/281–291
See application file for complete search history.

(56) References Cited

U.S. PATENT DOCUMENTS

| | | | | |
|---|---|---|---|---|
| 2,699,034 | A * | 1/1955 | Maire | 368/6 |
| 4,083,177 | A * | 4/1978 | Nishimura et al. | 368/84 |
| 5,033,035 | A * | 7/1991 | Affolter | 368/294 |
| 5,696,741 | A * | 12/1997 | Nussbaum | 368/281 |
| 6,278,873 | B1 * | 8/2001 | Itakura et al. | 455/575.6 |
| 6,762,976 | B1 * | 7/2004 | Tamaru et al. | 368/88 |
| 6,825,751 | B1 | 11/2004 | Kita et al. | |
| 7,793,361 | B2 * | 9/2010 | Ishihara et al. | 2/170 |
| 8,275,327 | B2 * | 9/2012 | Yi et al. | 455/90.3 |
| 8,301,211 | B2 * | 10/2012 | Lee et al. | 455/575.6 |
| 8,328,415 | B2 * | 12/2012 | Kachi et al. | 368/281 |
| 2002/0021624 | A1 * | 2/2002 | Hiranuma et al. | 368/282 |

(Continued)

FOREIGN PATENT DOCUMENTS

| | | |
|---|---|---|
| CN | 2672696 Y | 1/2005 |
| CN | 101431545 A | 5/2009 |
| TW | 200913653 A | 3/2009 |
| WO | WO 2005/103846 | 11/2005 |

OTHER PUBLICATIONS

European Search Report dated Feb. 14, 2012 for Application 10194337.1.

(Continued)

*Primary Examiner* — Adrian S Wilson
*Assistant Examiner* — Abhishek Rathod
(74) *Attorney, Agent, or Firm* — KED & Associates LLP

(57) ABSTRACT

A watch type mobile terminal may be provided that includes a display, a band coupled to a main body, and a support member having a first portion provided at an outer perimeter of the window hole and a second portion that extends from the first portion toward the central area of the window hole to cover the edge of the window hole. The mobile terminal may also include a window having a first surface facing an exterior of the main body and a second surface formed on an opposite side of the window, and at least a portion of the first surface of the window is covered by the second portion of the support member. A ring member may also be provided between the first portion of the support member and the window.

29 Claims, 7 Drawing Sheets

(56) References Cited

U.S. PATENT DOCUMENTS

| | | | |
|---|---|---|---|
| 2005/0047282 A1* | 3/2005 | Sakurazawa et al. | 368/281 |
| 2005/0270909 A1* | 12/2005 | Noirjean | 368/69 |
| 2007/0013408 A1* | 1/2007 | Hamamoto | 324/770 |
| 2009/0069045 A1* | 3/2009 | Cheng | 455/556.1 |
| 2009/0143117 A1* | 6/2009 | Shin et al. | 455/575.6 |
| 2010/0039905 A1* | 2/2010 | Wu | 368/281 |
| 2010/0112949 A1* | 5/2010 | Kim et al. | 455/41.3 |
| 2011/0007468 A1* | 1/2011 | Burton et al. | 361/679.03 |
| 2011/0053666 A1* | 3/2011 | Kang et al. | 455/575.6 |

OTHER PUBLICATIONS

Chinese Office Action dated Apr. 3, 2013 for Application 201010623063.4 (full Chinese text and English translation).

* cited by examiner

WATCH TYPE MOBILE TERMINAL

CROSS-REFERENCE TO RELATED APPLICATION

This application claims benefit and priority from Korean Application No. 10-2010-0022981, filed Mar. 15, 2010, the subject matter of which is incorporated herein by reference.

BACKGROUND

1. Field

Embodiments of the present invention may relate to a watch type mobile terminal that includes a window and that can be put on a user's wrist.

2. Background

A mobile terminal is a device that can be carried around and has one or more functions such as voice and video call communication, inputting and outputting information, storing data, and/or the like.

As functions become more diversified, the watch type mobile terminal may support more complicated functions such as capturing images or video, reproducing music or video files, playing games, receiving broadcast signals, and/or the like. By comprehensively and collectively implementing such functions, the watch type mobile terminal may be embodied in the form of a multimedia player or device.

In order to implement various functions of such multimedia players or devices, the multimedia player may require sufficient support in terms of hardware or software. For example, a user interface allowing users to easily and conveniently search for and select one or more functions may be provided.

Mobile terminals may be considered a personal mobile object that can express users' personality. Such demand on designs may include a watch type mobile terminal that can be put on a users' wrist.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
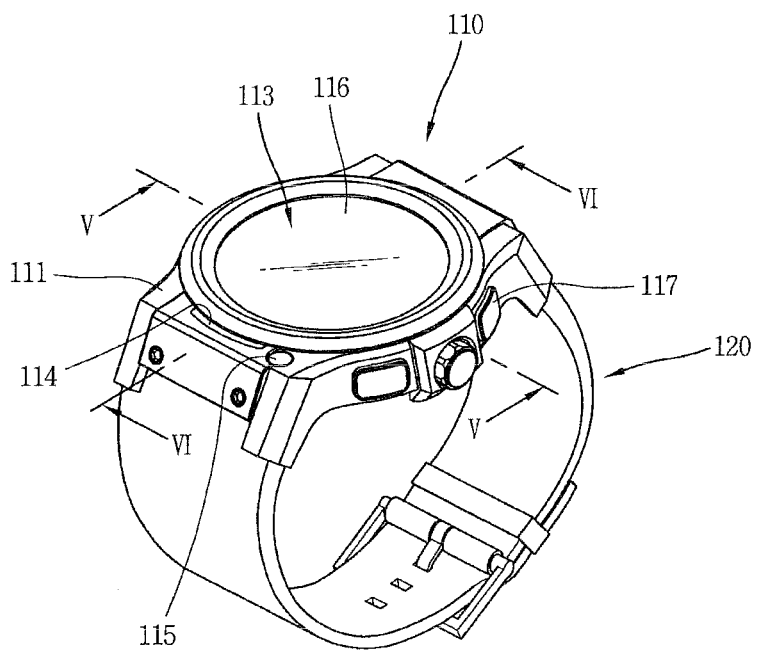
FIG. 1 is a front perspective view of a watch type mobile terminal according to an exemplary embodiment of the present invention.

A watch type mobile terminal according to exemplary embodiments may now be described in detail. In the following description, usage of suffixes such as 'module', 'part' or 'unit' used for referring to elements may be given merely to facilitate explanation, without having any significant meaning by itself.

The same or like reference numerals may be used for the same or like elements. As used herein, singular forms "a", "an" and "the" may be intended to include the plural forms as well, unless the context clearly indicates otherwise.

FIG. 1 is a front perspective view of a watch type mobile terminal according to an exemplary embodiment of the present invention. Other embodiments and configurations may also be provided.

A main body 110 of a watch type mobile terminal may connect to a band 120. The band 120 may be coupled to both sides of the main body 110. The band 120 may be provided around a user's wrist.

The main body 110 may include a wireless communication module 181 (FIG. 10) to transmit and receive radio signals to and from a mobile communication base station.

Figure 2:
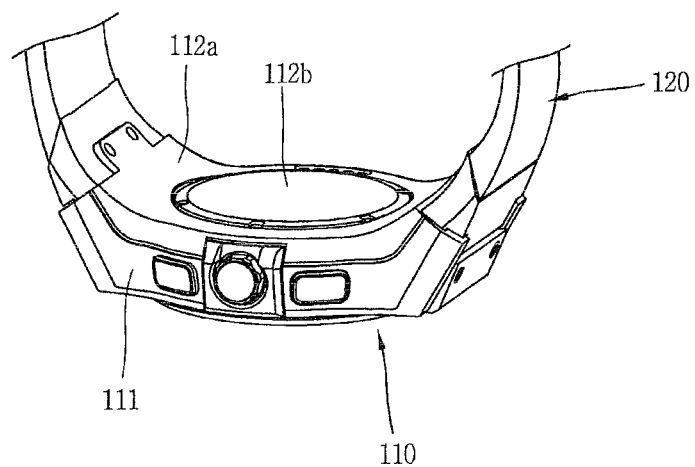
FIG. 2 is a rear perspective view of the watch type mobile terminal of FIG. 1.

An outer appearance of the main body 110 may be formed by a front case 111 and a rear case 112a (FIG. 2). The front case 111 and the rear case 112a may form an internal space in which various electronic components are installed.

A display unit 113, an audio output unit 114, an image input unit 115, and/or user input units 116 and 117 (or manipulation units) (FIG. 10) may be provided on the terminal main body, such as on the front case 111.

Figure 3:
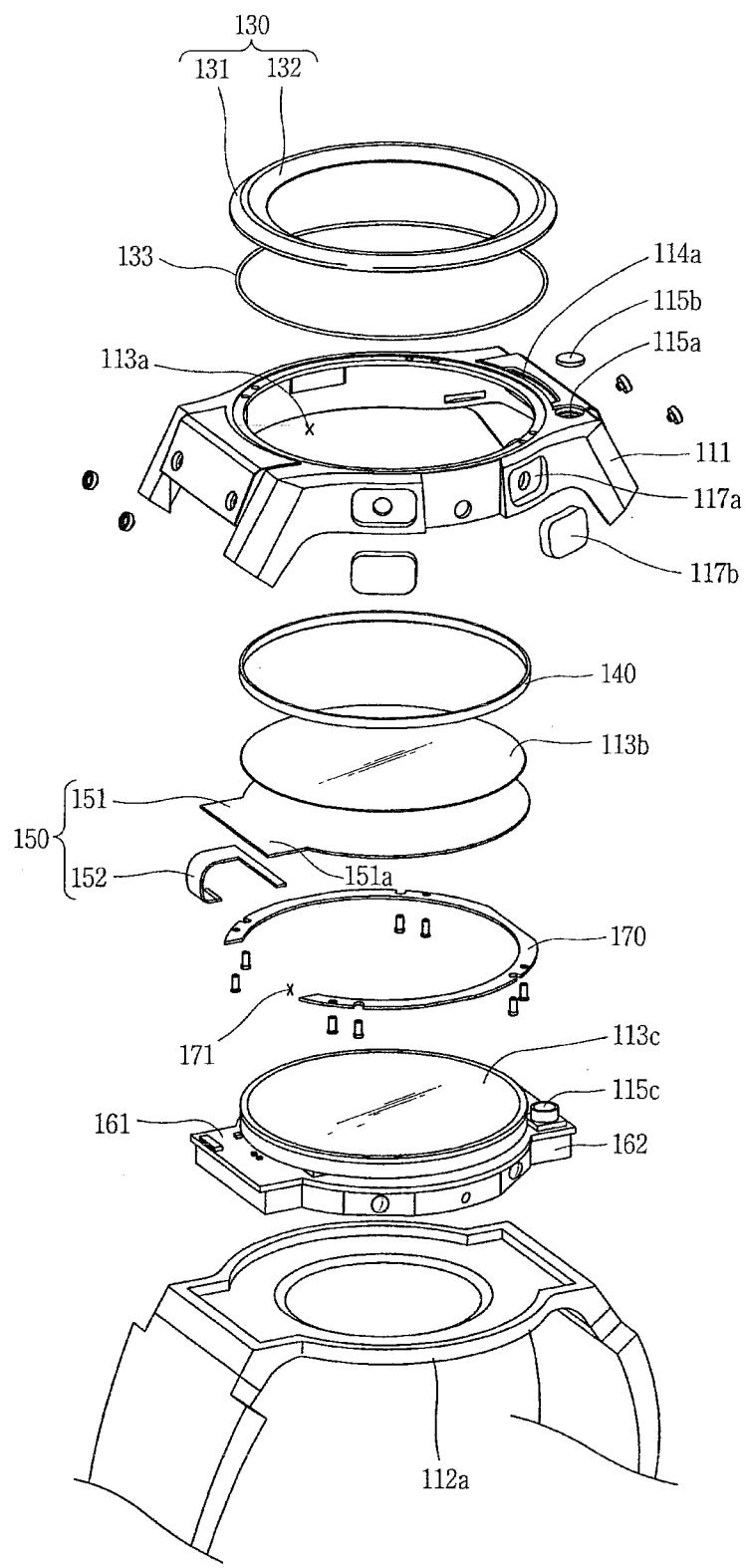
FIG. 3 is an exploded view of the watch type mobile terminal of FIG. 1.

The display unit 113 may occupy most of a circumferential surface of the front case 111. The display unit 113 may include a display 113c (FIG. 3). The display 113c may include at least one of a Liquid Crystal Display (LCD), a Thin Film Transistor-LCD (TFT-LCD), an Organic Light Emitting Diode (OLED) display, a flexible display, a three-dimensional (3D) display, and/or the like. The display 113c may be transparent or light-transmissive to allow viewing of the exterior, which may be called a transparent display. A typical transparent display may be a TOLED (Transparent Organic Light Emitting Diode) display (for example).

The watch type mobile terminal 100 may include two or more display units 113 according to its particular embodiment. For example, the display unit 113 may selectively display image information and time information according to a user information input.

The display unit 113 may include a touch sensor (or a touch pad) for receiving an input of information according to a user's touch. The touch sensor may detect the pressure of a touch input as well as a touch input position and area. The display unit 113 including the touch sensor may form a touch screen.

The audio output unit 114 and the image input unit 115 may be provided in an area adjacent to one of both ends of the display unit 113.

The audio output unit 114 may be implemented in the form of a speaker module for outputting a sound. The speaker module may include a receiver, a loud speaker, and/or the like.

The image input unit 115 may be in the form of a camera module 115c (FIG. 3) for capturing an image or video of the user and so one.

An audio input unit 187 (FIG. 10) may be provided in an area adjacent to the other of both end portions of the display unit 113. The audio input unit 187 may be in the form of a microphone, for example, in order to receive the user's voice, other sounds, and/or the like. The audio input unit 187 may be provided on the side of the terminal main body.

The user input units 116 and 117 may be units manipulated to receive a command for controlling operation of the watch type mobile terminal. For example, the user input units 116 and 117 may be implemented as a dome switch or a touch screen that can receive information or commands input by a user in a pushing or touching manner, and/or implemented in a manner of using a wheel, a jog and/or a joystick to rotate keys.

The touch screen may be used as the first user input unit 116 besides being used as an output device. The second user input unit 117 may be provided on the side of the front case 111.

Content inputted by the first and second user input units 116 and 117 may be different. For example, the first user input unit 116 may be formed to receive information such as numbers, characters, and/or symbols. The second user input unit 117 may be formed to receive START or END, or receive a command such as adjustment of a size of a sound outputted from the audio output unit 114 or changing into a touch recognition mode of the display unit 113, and the like.

FIG. 2 is a rear perspective view of the watch type mobile terminal of FIG. 1.

The rear case 112a may be coupled to the front case 111 to define the internal space. A cover 112b may be mounted on the rear case 112a to cover the internal space.

The rear case 112a and the cover 112b may be formed by injection-molding a synthetic resin and/or may be made of a metallic material such as stainless steel (STS), titanium (Ti), etc.

An interface 188 (FIG. 10) may be provided on a side or rear surface of the watch type mobile terminal.

The interface 188 may be at least one of a wired/wireless access terminal to be connected to an earphone, a short-range communication port (e.g., IrDA port, Bluetooth™ port, wireless LAN port, and the like), and a power supply terminal for supplying power to the mobile terminal. The interface 188 may be a card socket for accommodating an external card such as Subscriber Identification Module (SIM), User Identity Module (UIM), memory card for storing information, and/or the like.

For example, as the interface 188, a connection terminal (not shown) that may be connected to an external power supply device may be formed at a side of the rear case 112a in order to supply power to at least one element of the mobile terminal. The connection terminal (not shown) may be electrically connected with a power supply unit 190 (FIG. 10) (e.g., a rechargeable battery, and/or the like) of the terminal.

Figure 4:
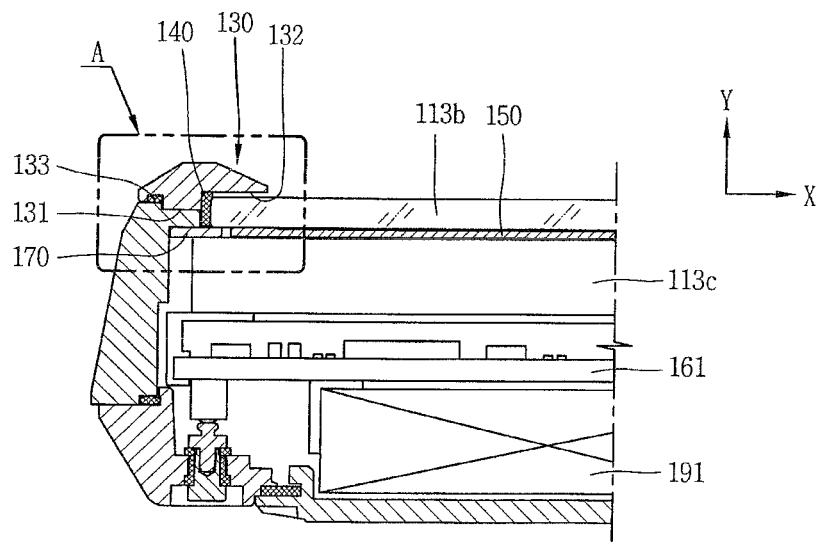
FIG. 4 is a sectional view of the watch type mobile terminal of FIG. 1 taken along line V-V.

FIG. 3 is an exploded view of the watch type mobile terminal of FIG. 1. FIG. 4 is a sectional view of the watch type mobile terminal of FIG. 1 taken along line V-V.

As shown in FIG. 3, a sound hole 114a and an image hole 115a may be formed on the front surface of the front case 111, and a speaker module (not shown) and a camera module 115c may be provided at an inner side of the front case 111 such that the speaker module and the camera module correspond to the sound hole 114a and the image hole 115a. An image window 115b formed to be light-transmissive may be provided on the image hole 115a. One surface of the front case 111 facing an exterior may be defined as a front surface, and the other surface of the front case 111 facing an internal space may be defined as a rear surface. The sound hole 114a and the speaker module may form the audio output unit 114, and the image hole 115a and the camera module 115b may form the image input unit 115 (FIG. 1).

A keypad 117b to be press-manipulated by the user to receive a control command may be mounted on the front case 111. At least a portion of the side of the front case 111 may form a keypad installation recess 117a, and the keypad 117b may be mounted in the keypad installation recess 117a such that the keypad 117b is movable along a side of the keypad installation recess 117a.

A window hole 113a may be formed on the front surface of the front case 111, and a support member 130 may be mounted thereon. The main body 110 may have an edge to define the window hole 113a having a central area.

The support member 130 may be formed as a hollow body and may be made of a metal material. The support member 130 may be decorations of the watch type mobile terminal.

The support member 130 may include a first portion 131 (or first area) and a second portion 132 (or second area).

The first portion 131 of the support member 130 may cover the window hole 113a, and the second portion 132 of the support member 130 may extend to the hollow part from the first portion 131 to cover an edge of the window hole 113a. For example, the first portion 131 may have an annular shape and cover the front surface of the front case 111. The first portion 131 may be provided at an outer perimeter of the window hole 113a. The second portion 132 may protrude from an inner circumference of the first portion 131 toward the center and cover the edge of the window hole 113a.

A gasket 133 may be provided between the front surface of the front case 111 and the support member 130. The gasket 133 may seal a coupled part between the support member 130 and the front case 111 to prevent introduction of a fluid into the interior of the terminal. That is, the gasket 133 may be provided between one surface of the main body 110 and the support member 130 in order to limit inflow of fluid into an interior of the main body 110.

The window 113b may be provided to correspond to the window hole 113a.

The window 113b may be made of a material allowing light to transmit therethrough, for example, a light-transmissive synthetic resin, tempered glass, and/or the like. The window 113b may include a portion through which light can not pass. Such a portion may be made of a material not allowing light to transmit therethrough or surface-treated not to allow light to transmit therethrough.

The window 113b may include a front surface (or first surface) facing an exterior of the terminal main body and a rear surface (or second surface) opposing the front surface. At least a portion of the front surface of the window 113b may be covered by the second portion 132 of the support member 130. One surface of the second portion 132 may face the internal space of the terminal, and the front surface of the window 113b may face one surface of the second portion 132.

A ring member 140 may be provided between the window hole 113a and the window 113b. The window 113b and the window hole 113a may have a circular shape. The ring member 140 may fit between a face confining the window hole 113a and an outer circumferential surface of the window 113b in order to attach the window 113b. The ring member 140 may be provided between the first portion 131 of the support member 130 and the window 113b.

A touch pad 150 may be mounted on the rear surface of the window 113b. The touch pad 150 may cover the rear surface of the window 113b and may be formed to detect a touch input. The touch pad 150 may be provided in the main body 110, and may face the rear surface of the window 113b.

The touch pad 150 may convert a change in capacitance, potential gradient, and the like, generated at a particular portion of the display unit 113 into an electrical input signal.

Embodiments of the present invention are not limited thereto. For example, the touch pad 150 may be mounted on the front surface of the window 113b and may detect pressure applied to a particular portion of the display unit 113.

The touch pad 150 may include an electrode film 151 having a protruding portion 151a and a signal connection member 152 coupled to the protruding portion 151a of the electrode film 151.

The electrode film 151 may generate an electrical signal corresponding to a touch input. The electrode film 151 may be used as a means for calculating coordinates on a screen to detect a touch applied to the screen. The electrode film 151 may be an indium tin oxide (ITO) electrode film, a carbon nanotube (CNT) electrode film, and/or the like. The electrode film 151 may have a circular or oval shape, and at least a portion of the outer circumference of the electrode film 151 may protrude in one direction.

The signal connection member 152 may be a flexible printed circuit board (FPCB), for example. One end of the signal connection member 152 may connect with the protruded portion 151a of the electrode film 151, and the other end may connect with a circuit board 161 to process the electrical signal. The signal connection member 152 may be coupled to the circuit board 161 to electrically connect the electrode film 151 to the circuit board 161. A portion of the signal connection member 52 may extend from an outer circumference of the electrode film 151 and may be bent toward the circuit board 161.

The circuit board 161 may be mounted on a support frame 162, and the support frame 162 may be provided in a space confined by the front surface and the side surface of the front case 111. The support frame 162 may be provided at the main body 110, and the circuit board 161 may be provided on the support frame 162.

At least one electronic component may be coupled to the support frame 162. The support frame 162 may be made of a material having a higher strength or rigidity than a material of the front case 111. For example, when the front case 111 is made of a synthetic resin (for example, polycarbonate) the support frame 162 may be made of stainless steel having a higher strength. Accordingly, the support frame 162 with a small thickness may reinforce strength of rigidity of the front case 111.

The support frame 162 may support the display 113c at the front side and may allow a battery 191 (FIG. 5) to be inserted on the rear surface.

The display 113c may have a circular or oval shape, and may correspond to the hollow part of the window 113b and the support member 130. Accordingly, visual information outputted to the display 113c may be recognized from the exterior. The window 113b may have an area corresponding to the display 113c. The display 113c and the window 113b may configure the display unit 113 (FIG. 1).

A cover member 170 may be mounted on the rear surface of the front case 111. The cover member 170 may cover edges of the rear surface of the window 113b and may be formed as a hollow body. The cover member 170 may firmly attach the window 113b fit by the ring member 140. At least a portion of the hollow part of the cover member 170 may be open in a direction perpendicular to a central axis of the hollow part.

Figure 5:
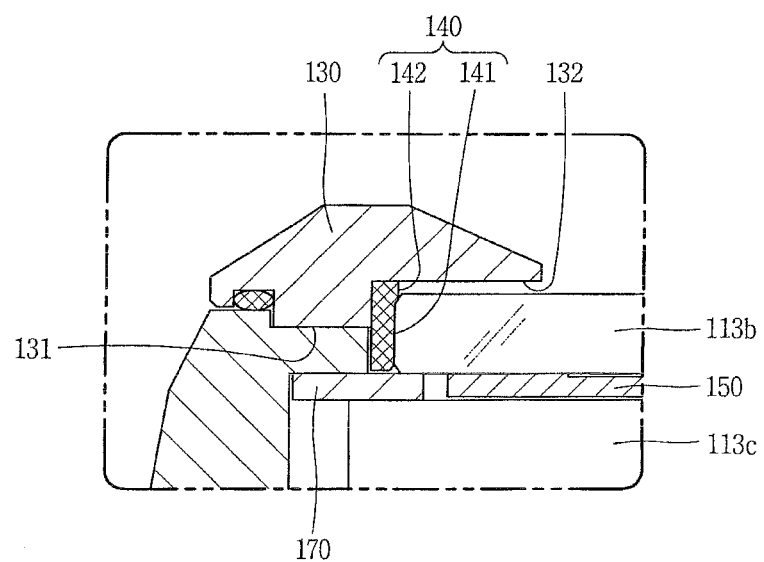
FIG. 5 is a partial exploded view of a portion 'A' of the watch type mobile terminal in FIG. 4.
Figure 6:
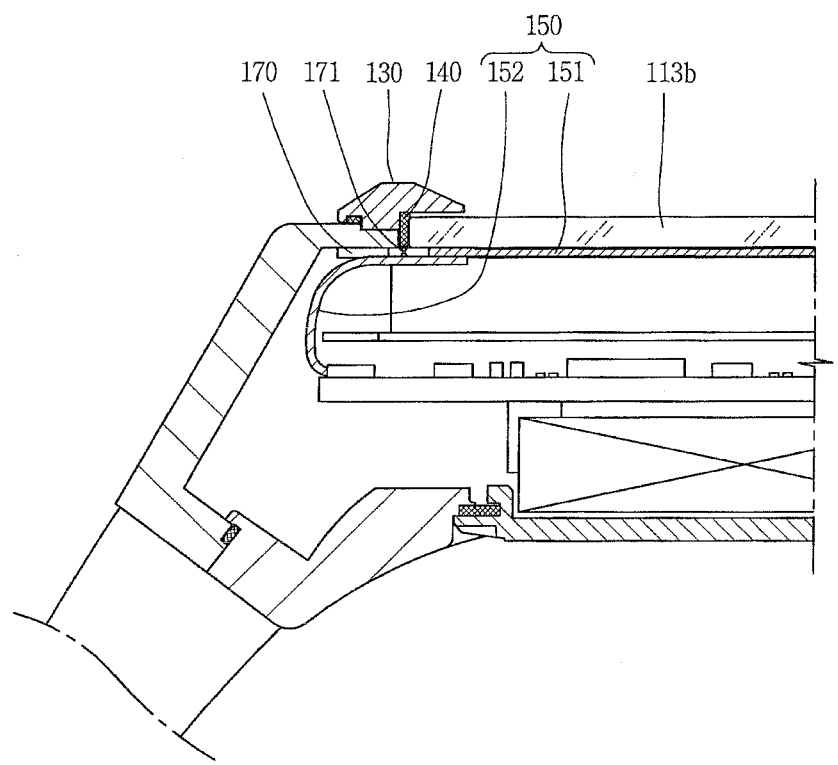
FIG. 6 is a sectional view of the watch type mobile terminal of FIG. 1 taken along line VI-VI.

A mechanism for mounting the window may now be described with reference to FIGS. 4 to 7C. FIG. 5 is a partial exploded view of a portion 'A' of the watch type mobile terminal in FIG. 4, FIG. 6 is a sectional view of the watch type mobile terminal of FIG. 1 taken along line VI-VI, and FIGS. 7A to 7C are views showing a process of assembling the watch type mobile terminal of FIG. 3.

As shown in FIG. 5, the first portion 131 of the support member 130 may protrude from the second portion 132 of the support member 130. The first and second portions 131 and 132 may form a step together as the first portion 131 protrudes, and the step may be formed such that the hollow part of the support member 130 gradually widens from the front surface of the window 113b toward the rear surface of the window 113b. Thus, when the window 113b is assembled, the window 113b may be inserted in a direction (+Y direction) from the rear surface of the front case 111 to the front surface of the front case 111. The support member 130 may be formed not to generate an undercut in the +Y direction. The first portion 131 and the second portion 132 of the support member 130 have a step based on the protruded second portion 132, and the step may be formed such that a hollow portion of the support member 130 increases gradually in a direction from the front surface of the window 113b to the rear surface of the window 113b.

The ring member 140 may be formed such that at least a portion is mounted on the second portion 132, and the inserted window 113b may be attached by the ring member 140. The process of assembling the window 113b may now be described with reference to FIGS. 7A to 7C.

Figure 7A:
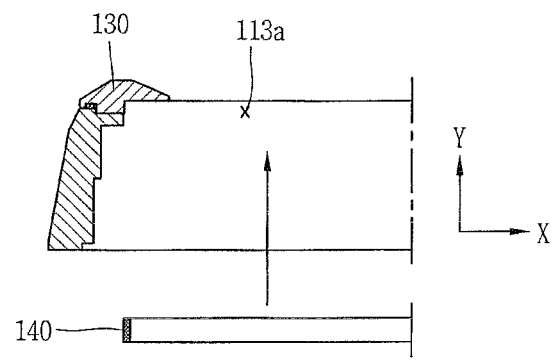
FIGS. 7A to 7C are views showing a process of assembling the watch type mobile terminal of FIG. 3.
Figure 7B:
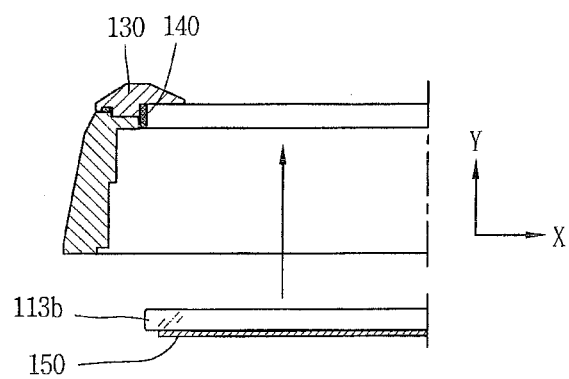
Figure 7C:
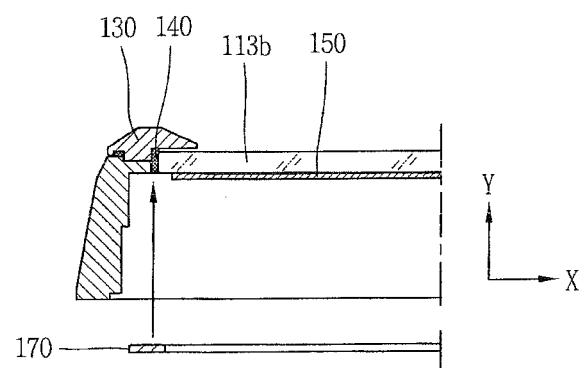

As shown in FIG. 7A, the ring member 140 may be inserted into the second portion 132 of the support member 130, and in this example, the ring member 140 may be inserted in the +Y direction. As shown in FIG. 7B, the window 113b may be inserted in the +Y direction and may be attached in the window hole 113a by the ring member 140. In this example, the window 113b may be inserted in the +Y direction in a state that the touch pad 150 is mounted. The cover member 170 may be mounted on the rear surface of the front case 111 to cover the ring member 140 and the rear surface of the window 11b.

The ring member 140 includes an insertion portion 141 (FIG. 5) formed on an inner circumferential surface of the ring member 140, and the window 113b is provided in the insertion portion 141. The ring member 140 may further include a protrusion 142 (FIG. 5) formed on the inner circumferential surface such that the protrusion 142 protrudes from the insertion portion 141 toward a hollow portion of the support member 130.

Additionally, the main body 110 includes a first band connection portion at a first area where the band 120 is coupled to the main body 110 and a second band connection portion at an area where the band 120 is coupled to the main body 110. The protruding portion 151a of the electrode film 151 and the signal connection member 152 are provided at the first band connection portion. The second connection portion may include the image hole 115a to receive the image window 115b.

The foregoing assembling process is a bottom-up type assembling process, which has at least one advantage in that a bezel of the window may be formed to be narrower, compared with a top-down type assembling process. The top-down type assembling process may be applied to the structure for mounting a window 13b in the arrangement shown in FIG. 11.

Figure 11:
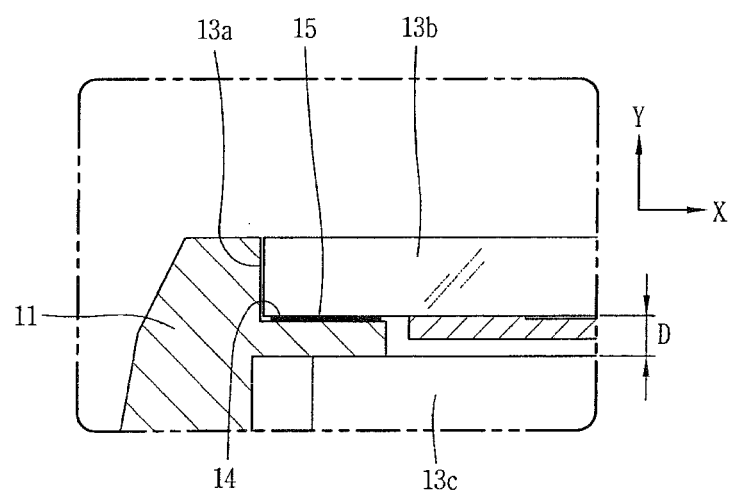
FIG. 11 is a sectional view of a watch type mobile terminal assembly according to an arrangement.

FIG. 11 is a sectional view of a watch type mobile terminal assembly according to an arrangement. Other arrangements may also be provided. As shown in FIG. 11, a portion covering a window hole 13a from a front surface of a case 11 has a step toward an internal space. A step portion 14 may be formed as a recess on the front surface of the case 11. The window 13b may be mounted on the step portion 14 by a medium such as an adhesive 15 or a double-sided tape. An assembling may be performed in a −Y direction. As shown, in order to allow the window 13 to be mounted on the step portion 14, the step portion 14 may need to have a sufficient width and thickness, and thus a window bezel may be wider and thicker. The distance (D) between a display 13c and the window 13b may be at least equal to or greater than thickness of the step portion 14.

In comparison with reference to FIG. 5, according to a window mounting mechanism, because the cover member 170 is formed as a very thin plate, the distance between the display 113c and the window 113b may be smaller. Thus, a displayed screen image may be closer to the window 113b and brightness of the screen can be improved.

With reference to FIG. 5, the insertion portion 141 is formed on the inner circumferential surface of the ring member 140 to allow the side of the window 113b to be inserted therein. The protrusion 142 may be formed on an inner circumferential surface of the ring member 140 and may protrude toward the hollow part of the support member 130 in order to limit an insertion of the window 113b. For example, the section of the ring member 140 may extend in the +Y direction and may be bent toward the center of the ring member 140. Accordingly, the window 113b may be inserted in the +Y direction along the insertion portion 141, and as the window 113b reaches the protrusion 142, it may be attached at a particular position within the window hole 113a.

When the side of the window 113b is inserted into the insertion portion 141, the ring member 140 may be elastically deformed between the window hole 113a and the window 113b. The ring member 140 may elastically deform when the window 113b is inserted into the insertion portion 141. The ring member 140 may be made of an elastic material and may be pressurized to be compressed and deformed by the window 113b. Accordingly, the ring member 140 serves to attach the window 113b and seal it for waterproofing.

With reference to FIG. 6, the signal connection member 152 may extend from an outer circumference of the electrode 151 such that at least a portion thereof is wound (or bent) toward the circuit board 161. The window 113b, the display 113c, and the circuit board 161 may be provided in a stacked manner, and the signal connection member 152 may extend from the outer circumference of the electrode film 151, passing the display 113c, so as to be connected to the circuit board 161.

The terminal body may have such an external appearance that at least a portion thereof is sloped in a direction in which it is wound on the user's wrist. The signal connection member 152 may be wound at an internal space of the sloped portion.

As discussed above with reference to FIG. 3, at least a portion of the hollow part of the cover member 170 may be open in a direction perpendicular to the central axis of the hollow part. The electrode film 151 may be a circular shape, and at least a portion of the outer circumference of the electrode film 151 may protrude toward the open portion 171 of the cover member 170. With reference to FIG. 6, the open portion 171 of the cover member 170 may face the sloped portion of the terminal body.

The signal connection member 152 may pass through the open portion 171 of the cover member 170. One end of the signal connection member 152 may be connected to the protruded portion 151a of the electrode film 151, and the other end of the signal connection member 152 may be connected to the circuit board 61. If the window 13b is assembled in the top-down manner as shown in FIG. 11, it would be difficult to electrically connect the electrode film and the circuit board. However, in the exemplary embodiment, electrical connection may be implemented through the simple structure as described above.

Figure 8:
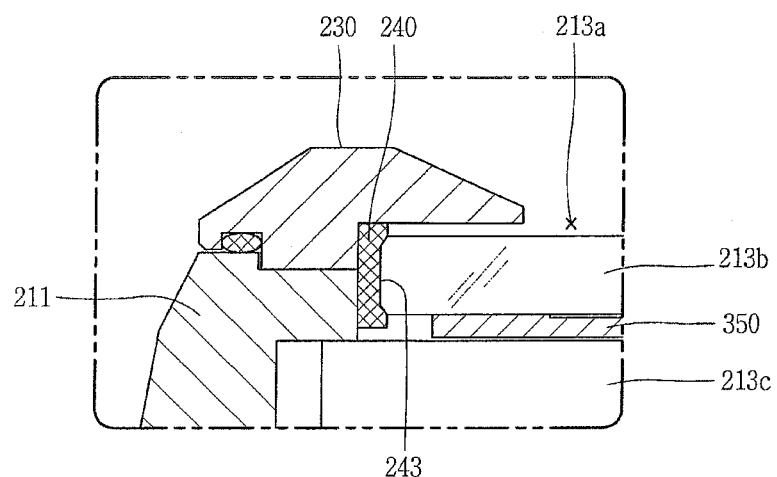
FIGS. 8 and 9 are sectional views showing a watch type mobile terminal according to an exemplary embodiment of the present invention.
Figure 9:
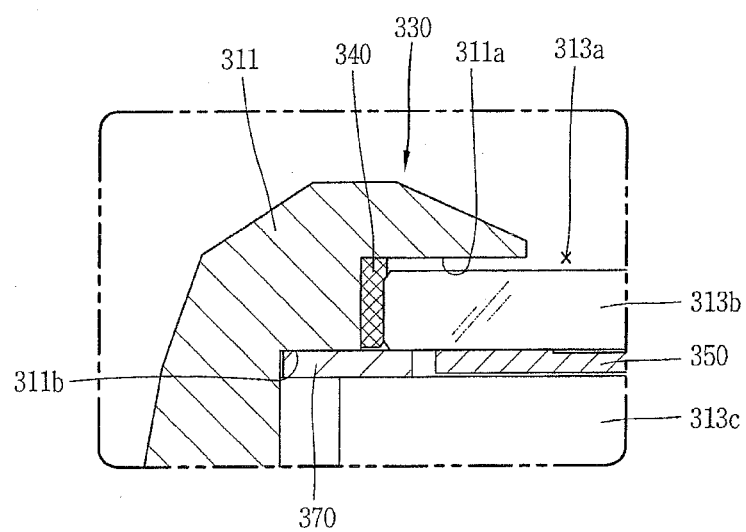

FIGS. 8 and 9 are sectional views showing an example of a watch type mobile terminal according to an exemplary embodiment of the present invention. Other embodiments and configurations may also be provided.

With reference to FIG. 8, a recess portion 243 may be formed on the inner circumferential surface of the ring member 240 to allow the side of the window 213b to be inserted therein. The recess portion 243 may be formed to be perpendicular to the inner circumferential surface of the ring member 240, and the side of the window 213b may be mounted on a bottom surface 243a of the recess portion 243.

The window 213 may fit according to elastic deformation of the ring member 240 and may be attached as the window 213 is inserted in the recess portion 243. Thus, the window 113b can be firmly attached (or fixed) even without the cover member 170 (FIG. 5).

With reference to FIG. 9, the shape of the support member 330 can be implemented by a front case 311. The support member 330 may form one case of the terminal body. The front case 311 may be formed to gradually widen toward the interior of a window hole 313a.

The window hole 313a may form first and second step faces 311a and 311b. The first and second step faces 311a and 311b may be formed on a rear surface of the front case 311. The first step face 311a may be a bezel of the window, and the second step face 311b may allow the cover member 370 to be mounted thereon. With such a configuration, a window mounting mechanism assembled in the bottom-up manner may be implemented without using the support member 130 (FIG. 5).

Figure 10:
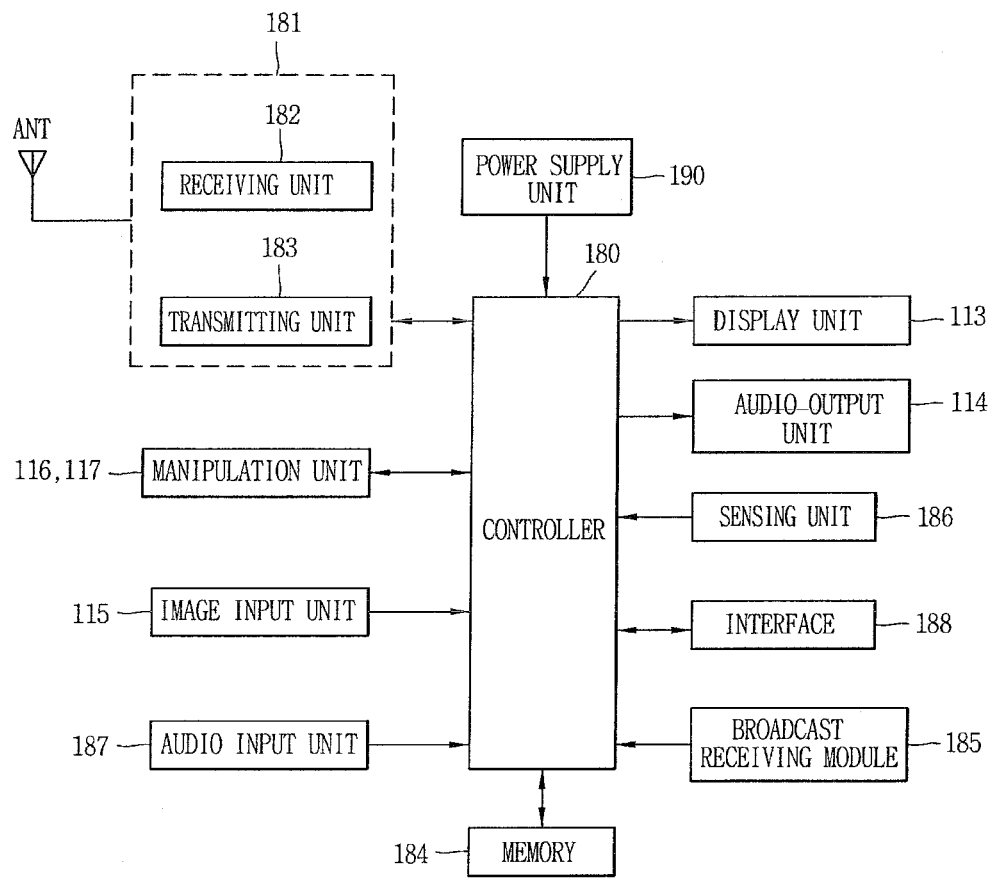
FIG. 10 is a schematic block diagram of a watch type mobile terminal according to an exemplary embodiment of the present invention.

FIG. 10 is a schematic block diagram of a watch type mobile terminal according to an exemplary embodiment of the present invention. Other embodiments and configurations may also be provided.

As shown in FIG. 10, the watch type mobile terminal may include the display unit 113, the audio output unit 114, the video input unit 115, the user input units 116 and 117, the power supply unit 190, the controller 180, the wireless communication module 181, a memory 184, a broadcast receiving module 185, a sensing unit 186, an audio input unit 187, and/or an interface 188.

The controller 180 may control an overall operation of the watch type mobile terminal. For example, the controller 190 may perform related control and processing for a voice call communication, data communication, telephony communication and/or the like.

The wireless communication module 181 may transmit and receive radio signals with a mobile communication base station via an antenna. For example, the wireless communication module 181 may manage transmission and reception of audio data, text data, video data and control data under control of the controller 180. The wireless communication module 181 may include a transmitting unit 182 for modulating and transmitting a signal to be sent, and a receiving unit 183 for demodulating a signal received.

The user input units 116 and 117 may provide the controller 180 with key input data input by a user to control operations of the mobile terminal. The user input units 116 and 117 may include a dome switch, a touchpad (e.g., static pressure/capacitance), a jog wheel, a jog switch and/or the like.

The video input unit 115 may process image frames of still images or video obtained by an image sensor in a video call mode or a capturing mode. Such processed image frames may be converted into image data displayable on the display unit 113 to be then output on the display unit 113.

The image frames processed by the video input unit 115 may be stored in the memory 184 under control of the controller 180 and/or may be sent to the exterior via the wireless communication module 181.

The audio input unit 187 may receive an external audio signal via a microphone and processes it into electrical voice data, while the mobile terminal is in a particular mode, such as phone call mode, recording mode and voice recognition. The processed audio signal may be converted into digital data.

Such processed digital data may be converted into a data format transmittable to a mobile communication base station via the wireless communication module 181 when the mobile terminal is in the phone call mode, and may then be outputted to the wireless communication module 181. The processed voice data may be stored in the memory 184 when the mobile terminal is in a recording mode.

The audio input unit 187 may include assorted noise removing algorithms to remove noise generated in the course of receiving the external audio signal.

The display unit 113 may display information processed in the watch type mobile terminal. For example, when the watch type mobile terminal is in the phone call mode, the display unit 113 may display User Interface (UI) or (Graphic User Interface (GUI)) related to the call under the control of the controller 180. When the watch type mobile terminal is in the video call mode or the image capturing mode, the display unit 113 may display a captured image or UI or GUI under the control of the controller 180. When the display unit 113 includes a touch screen, it may be used as an input device as well as an output device.

The audio output unit 114 may convert audio data received from the wireless communication module 181 or audio data stored in the memory 184 and output the same to the exterior under control of the controller 190 when the mobile terminal is in the call reception mode, a phone call mode, a recording mode, a voice recognition mode, and/or a broadcast receiving mode.

The audio output unit 114 may output an audio signal associated with a function (e.g., outputting a call receiving sound, a message receiving sound, or the like) performed in the watch type mobile terminal.

The sensing unit 186 may detect a current status of the watch type mobile terminal. The sensing unit 186 may detect an open/close status of the watch type mobile terminal, a location of the watch type mobile terminal, a presence or absence of user contact with the watch type mobile terminal and the like, and may generate a sensing signal for controlling operation of the watch type mobile terminal. For example, when the watch type mobile terminal is a slide type mobile phone, the sensing unit 186 may sense the open or closed state of the slide type mobile terminal, and output the sensing results to the controller 180 so that operation of the watch type mobile terminal can be controlled. Other examples include the sensing unit 186 sensing the presence or absence of power provided by the power supply unit 190, the presence or absence of a coupling or other connection between the interface 188 and an external device.

The interface 188 may serve as an interface with external devices such as wired/wireless headsets, external chargers, wired/wireless data ports, card sockets (e.g., memory card, SIM/UIM card or the like) and the like, connected to the watch type mobile terminal. The interface 188 may allow the mobile terminal to receive data or power from external devices and transfer such data or power to each component inside the mobile terminal, and/or transmit internal data of the mobile terminal to external devices.

The memory 184 may store a program for the control and processing of the controller 190, and/or temporarily store input/output data (e.g., phone book data, messages, still images, video or the like).

The memory 184 may store a program for controlling operation of the watch type mobile terminal.

The memory 184 may include typically known hard disk, a card-type memory (e.g., SD or XD memory), a flash memory, RAM, ROM and/or the like.

The broadcast receiving module 185 may receive a broadcast signal transmitted via satellites or terrestrial waves and convert such broadcast signal into a broadcast data format capable of being output to the audio output unit 114 and the display unit 113 so as to output the converted signal to the controller 180. The broadcast receiving module 185 may also receive additional data associated with broadcasting (e.g., Electric Program Guide (EPG), channel list, or the like). The broadcast data converted in the broadcast receiving module 185 and the additional data may be stored in the memory 184.

The power supply unit 190 may provide power required by the various components for the mobile terminal under control of the controller 180. The provided power may be internal power, external power, and/or combinations thereof.

The watch type mobile terminal configured as described above may have the following advantages. That is, because the front surface of the window is covered by the support member and the ring member attaches the window, a width and thickness of the part where the window is mounted can be reduced, and accordingly the display area may be increased.

Because the ring member that is elastically deformed attaches the window, a good waterproofing structure can be implemented.

Because the front surface of the window is provided on the inner surface of the support member, the window may be assembled in a direction from the inner surface toward the exterior. Accordingly, distance between the window and the display can be reduced, a displayed screen image can become close on the window, and brightness of the screen can be improved.

The electrical connection between the touch pad and the circuit board may be facilitated through the touch pad mounted on the rear surface of the window.

An embodiment of the present invention may provide a watch type mobile terminal that can be put on a user's wrist so as to be used, and the mobile terminal may have a large display area.

An embodiment may provide a watch type mobile terminal having an improved waterproof structure.

A watch type mobile terminal may include a main body having a window hole, a band connected with both sides of the main body, and a support member configured as a hollow body and having a first area formed to surround the window hole and a second area extending toward a hollow part from the first area in order to cover the edges of the window hole. The watch type mobile terminal may include a window having a front surface facing the exterior of the main body and a rear surface opposing the front surface formed on the opposite side of the front surface, and disposed such that at least a portion of the front surface is covered by the second area at the window hole. A ring member may be inserted between the window hole and the window to fix the window.

The support member may be mounted on one surface of the main body, and the first area may be formed to cover one surface of the main body. The first area may protrude from the second area. The ring member may be formed such that at least a portion thereof is mounted on the second area. The first and second areas may be formed to have a step due to the protruded first area. The step may be formed such that the hollow portion of the support member increases gradually in a direction from the front surface to the rear surface of the window.

An insertion portion may be formed on an inner circumferential surface of the ring member to allow the side of the window to be inserted therein. A protrusion may be formed on an inner circumferential surface of the ring member such that it protrudes from the insertion portion toward the hollow portion in order to limit the insertion of the window. The ring member may be configured such that when the side of the window is inserted into the insertion portion, the ring member is elastically deformed between the window hole and the window.

The watch type mobile terminal may include a touch pad. The touch pad may be disposed to cover the rear surface of the window and configured to detect a touch input applied thereto. The touch pad may include an electrode film and a signal connection member. The electrode film may generate an electric signal corresponding to the touch input, and at least a portion of an outer circumference of the electrode film may protrude in one direction. The signal connection member may be disposed to penetrate an open portion of the cover member. One end of the signal connection member may be connected to the protruded portion of the electrode film and the other end of the signal connection member may be connected to a circuit board to process the electric signal.

The signal connection member may be formed such that at least a portion thereof extends from an outer circumference of the electrode film and is wound toward the circuit board. The watch-type mobile terminal may include a display unit disposed to correspond to the hollow portion. The window, the display unit, and the circuit board may be laminated to be disposed, and the signal connection member may extend from the outer circumference of the electrode film and be connected to the circuit board through the display unit.

The watch-type mobile terminal may include a cover member. The cover member may be mounted on the main body and may be formed to cover edges of a rear surface of the window. The cover member may be configured as a hollow body, and at least a portion of a hollow portion of the cover member may be open in a direction perpendicular to a central axis of the hollow portion. The window may have a circular shape, a touch pad may be disposed on a rear surface of the window, the touch pad may include an electrode film formed to have a circular shape and having a portion of the circumference protruded toward an open portion of the cover member. A signal connection member may have one end connected with the protruded portion of the electrode film and the other end connected with the circuit board to process the electrical signal.

The watch type mobile terminal may include a gasket. The gasket may be disposed between one surface of the main body and the support member in order to limit an inflow of a fluid in the interior of the main body.

The support member may be formed to configure the case of the main body.

Exemplary embodiments may be implemented in several forms without departing from characteristics thereof, and it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A watch type mobile terminal comprising:
    a main body having an edge to define a window hole having a central area;
    a circuit board within the main body;
    a display on the circuit board;
    a band coupled to the main body;
    a support member having a first portion provided at an outer perimeter of the window hole and a second portion that extends from the first portion toward the central area of the window hole to cover the edge of the window hole, the second portion having at least one first surface facing an exterior of the mobile terminal and a second surface facing an interior of the mobile terminal;
    a window having a first surface facing the exterior of the mobile terminal and a second surface, formed on an opposite side of the window, facing the interior of the mobile terminal, and at least a portion of the first surface of the window is facing the second surface of the second portion of the support member;
    a ring member provided between the first portion of the support member and the window,
    wherein the ring member includes:
        an insertion portion formed at an inner circumferential surface of the ring member, and the window is provided into the insertion portion, and
        a protrusion formed on the inner circumferential surface of the ring member such that the protrusion protrudes from the insertion portion toward a hollow portion of the support member.

2. The watch type mobile terminal of claim 1, further comprising a support frame provided at the main body, the circuit board provided on the support frame.

3. The watch type mobile terminal of claim 1, further comprising a touch pad provided within the main body, the touch pad facing the second surface of the window.

4. The watch type mobile terminal of claim 3, wherein the touch pad includes an electrode film having a protruding portion and a signal connection member coupled to the protruding portion of the electrode film.

5. The watch type mobile terminal of claim 4, wherein the signal connection member is coupled to the circuit board to electrically connect the electrode film to the circuit board.

6. The watch type mobile terminal of claim 4, wherein the main body includes a first band connection portion at a first area where the band is coupled to the main body and a second band connection portion at a second area where the band is coupled to the main body.

7. The watch type mobile terminal of claim 6, wherein the protruding portion of the electrode film and the signal connection member are provided at the first band connection portion.

8. The watch type mobile terminal of claim 6, wherein the second band connection portion includes a hole to receive a camera window.

9. The watch type mobile terminal of claim 4, wherein a portion of the signal connection member extends from an outer circumference of the electrode film and is bent toward the circuit board.

10. The watch type mobile terminal of claim 4, wherein the window has a circular shape, and the electrode film has a circular shape.

11. The watch type mobile terminal of claim 1, wherein the second portion of the support member protrudes from the first portion of the support member.

12. The watch type mobile terminal of claim 11, wherein the first portion and the second portion of the support member have a step based on the protruded second portion, and the step is formed such that the hollow portion of the support member increases gradually in a direction from the first surface of the window to the second surface of the window.

13. The watch type mobile terminal of claim 1, wherein the ring member elastically deforms when the window is inserted into the insertion portion.

14. The watch type mobile terminal of claim 1, further comprising:
a cover member on the main body, the cover member to cover an edge of the second surface of the window.

15. The watch type mobile terminal of claim 1, further comprising:
a gasket between one surface of the main body and the support member in order to limit inflow of fluid into an interior of the main body.

16. A watch type mobile terminal comprising:
a main body having an edge to define a window hole, the main body including a support member with a first portion to surround an outer perimeter of the window hole and a second portion that protrudes from the first portion toward a central area of the window hole and covers a portion of the edge of the window hole, the second portion having at least one first surface facing, in a first direction, an exterior of the mobile terminal and a second surface facing, in a second direction, an interior of the mobile terminal;
a circuit board within the main body;
a display on the circuit board;
a band to couple to the main body;
a window having a first window surface and a second window surface on an opposite side of the window, the first window surface facing in the first direction, and the second window surface facing in the second direction, and the second portion of the support member facing a portion of the first window surface such that the second portion of the support member covers the portion of the first window surface;
a ring member between the first portion of the support member and the window, wherein the ring member includes:
an insertion portion formed at an inner surface of the ring member, and the window is provided into the insertion portion, and
a protrusion formed on the inner surface of the ring member such that the protrusion protrudes from the insertion portion toward a hollow portion of the support member.

17. The watch type mobile terminal of claim 16, further comprising a support frame provided at the main body, the circuit board provided on the support frame.

18. The watch type mobile terminal of claim 16, further comprising a touch pad provided within the main body, the touch pad facing the second window surface.

19. The watch type mobile terminal of claim 18, wherein the touch pad includes an electrode film having a protruding portion and a signal connection member coupled to the protruding portion of the electrode film.

20. The watch type mobile terminal of claim 19, wherein the signal connection member is coupled to the circuit board to electrically connect the electrode film to the circuit board.

21. The watch type mobile terminal of claim 19, wherein the main body includes a first band connection portion at a first area where the band couples to the main body and a second band connection portion at a second area where the band couples to the main body.

22. The watch type mobile terminal of claim 21, wherein the protruding portion of the electrode film and the signal connection member are provided at an area corresponding to the first band connection portion.

23. The watch type mobile terminal of claim 21, wherein the second band connection portion includes a hole to receive a camera window.

24. The watch type mobile terminal of claim 19, wherein a portion of the signal connection member extends from an outer circumference of the electrode film and is bent toward the circuit board.

25. The watch type mobile terminal of claim 19, wherein the window has a circular shape, and the electrode film has a circular shape.

26. The watch type mobile terminal of claim 16, wherein the first portion and the second portion of the support member have a step based on the protruded second portion, and the step is formed such that a hollow portion of the support member increases gradually in a direction from the first window surface to the second window surface.

27. The watch type mobile terminal of claim 16, wherein the ring member elastically deforms when the window is inserted into the insertion portion.

28. The watch type mobile terminal of claim 16, further comprising:
a cover member on the main body, the cover member to cover an edge of the second window surface.

29. The watch type mobile terminal of claim 16, further comprising:
a gasket between one surface of the main body and the support member in order to limit inflow of fluid into an interior of the main body.

* * * * *